United States Patent
Gunawardena et al.

(12) 
(10) Patent No.: US 12,404,661 B2
(45) Date of Patent: Sep. 2, 2025

(54) AUTOMATIC FAUCET

(71) Applicant: AS America, Inc., Piscataway, NJ (US)

(72) Inventors: Mahendra Gunawardena, Hillsborough, NJ (US); Eric B. Soberano, Barnegat, NJ (US); Steven D. Kappus, Manville, NJ (US)

(73) Assignee: AS America, Inc., Piscataway, NJ (US)

( * ) Notice: Subject to any disclaimer, the term of this patent is extended or adjusted under 35 U.S.C. 154(b) by 230 days.

(21) Appl. No.: 17/775,488

(22) PCT Filed: Nov. 13, 2020

(86) PCT No.: PCT/US2020/060356
§ 371 (c)(1),
(2) Date: May 9, 2022

(87) PCT Pub. No.: WO2021/097169
PCT Pub. Date: May 20, 2021

(65) Prior Publication Data
US 2022/0389695 A1    Dec. 8, 2022

Related U.S. Application Data

(60) Provisional application No. 62/935,347, filed on Nov. 14, 2019.

(51) Int. Cl.
*E03C 1/05* (2006.01)
*G01V 3/08* (2006.01)

(52) U.S. Cl.
CPC .............. *E03C 1/057* (2013.01); *G01V 3/088* (2013.01)

(58) Field of Classification Search
CPC .................................. E03C 1/057; G01V 3/088
See application file for complete search history.

(56) References Cited

U.S. PATENT DOCUMENTS

| | | |
|---|---|---|
| 8,561,626 B2 | 10/2013 | Sawaski et al. |
| 8,944,105 B2 | 2/2015 | Rodenbeck et al. |
| 9,187,884 B2 | 11/2015 | Belz et al. |
| 9,394,675 B2 | 7/2016 | Sawaski et al. |
| 9,695,579 B2 | 7/2017 | Herbert et al. |
| 9,702,128 B2 | 7/2017 | Sawaski |
| 9,795,255 B2 | 10/2017 | Rosko et al. |
| 10,323,393 B2 | 6/2019 | Thompson et al. |
| 2007/0057215 A1 | 3/2007 | Parsons et al. |

(Continued)

OTHER PUBLICATIONS

PCT/US2020/060356 International Search Report and Written Opinion dated Feb. 5, 2021.

*Primary Examiner* — Christine J Skubinna
(74) *Attorney, Agent, or Firm* — Rameshwar U. Patel; Tyler A. Stevenson; Anna-lisa L. Gallo

(57) ABSTRACT

An automatic faucet assembly comprising a faucet body and spout; an electromechanical valve; a controller; and a power source, wherein the faucet body comprises an electrically conductive material and is configured to be associated with an electric field, the faucet spout is configured to deliver water when the electromechanical valve is in an open position and to not deliver water when the electromechanical valve is in a closed position, the controller, the faucet body, the electromechanical valve, and the power source are in electrical communication, and the controller is configured to detect motion of an end user in the electric field.

20 Claims, 2 Drawing Sheets

(56) References Cited

U.S. PATENT DOCUMENTS

| | | |
|---|---|---|
| 2009/0031493 A1 | 2/2009 | Tsujita et al. |
| 2010/0108165 A1* | 5/2010 | Rodenbeck ............ E03C 1/057 137/801 |
| 2014/0159749 A1* | 6/2014 | Belz ...................... G01D 11/30 324/690 |
| 2014/0174556 A1 | 6/2014 | Herbert et al. |
| 2014/0261750 A1* | 9/2014 | Rosko ................... F16K 19/006 137/78.1 |
| 2014/0261767 A1 | 9/2014 | DeVries et al. |
| 2016/0177550 A1* | 6/2016 | Sawaski ................. E03C 1/057 137/78.1 |
| 2017/0306596 A1* | 10/2017 | Sawaski ............... E03C 1/0412 |
| 2019/0292757 A1* | 9/2019 | Sawaski ............... E03C 1/0412 |

* cited by examiner

AUTOMATIC FAUCET

The disclosure relates to automatic hands-free faucets having capacitive sensing.

BACKGROUND

Automatic hands-free or "touchless" faucets are employed in many settings, for instance office buildings, restaurants, airports, hospitals, and other similar settings. Automatic faucets generally employ infrared proximity sensors or capacitive proximity sensors to determine the presence of an operator or end user, for example a person desirous of washing one's hands. Typically, a sensor is configured to detect the presence of an end user's hand, such that upon detection, a valve is opened to allow for water flow for a specified time period.

Sensors generally function by detecting the presence of an end user's hand within a detection zone. Detection zones of automatic faucets are sometimes difficult to locate, leading to a failure of a faucet to deliver water. Further, a sensitive sensor may allow for a faucet to too easily dispense water, leading to inadvertent delivery of water. Further still, an amount of water delivered may not be enough for the desired use, or may be too much—leading to wasting energy and/or water.

Desired is an automatic faucet that easily detects an end user desirous of operating the faucet and delivering a desired amount of water, while minimizing wasted energy and/or water.

SUMMARY

Accordingly, disclosed is an automatic faucet assembly comprising a faucet body and spout; an electromechanical valve; a controller; and a power source, wherein the faucet body comprises an electrically conductive material and is configured to be associated with an electric field, the faucet spout is configured to deliver water when the electromechanical valve is in an open position and to not deliver water when the electromechanical valve is in a closed position, the controller, the faucet body, the electromechanical valve, and the power source are in electrical communication, and the controller is configured to detect motion of an end user in the electric field.

Also disclosed is a method of controlling fluid flow from a faucet having a faucet body and spout, the method comprising detecting an end user approaching the faucet body.

Also disclosed is a method of controlling fluid flow from a faucet having a faucet body and spout, the method comprising detecting a movement of an end user's hand or hands at or near the faucet body and/or faucet spout.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

Figure 1:
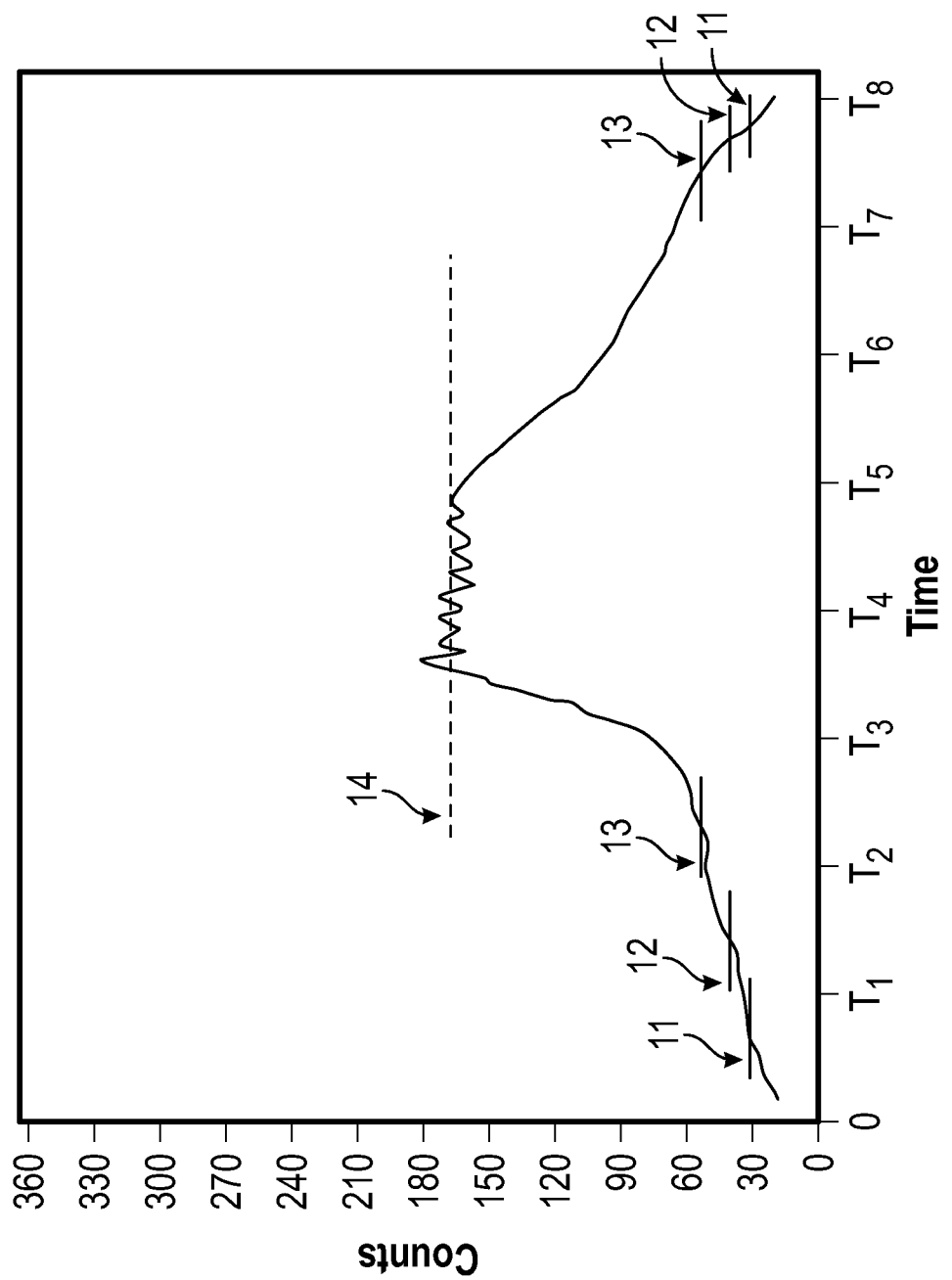
FIG. 1 represents a capacitive signal counts vs. time graph for an end user approaching a faucet, moving their hands at the faucet, and departing the faucet, according to an embodiment.

A faucet body and a faucet spout may comprise one or more electrically conductive materials, including one or more metals and/or electrically conducting polymers. Electrically conducting metals include copper, brass, steel, galvanized steel, etc.

An electromechanical valve may be a solenoid valve.

The controller (microcontroller) is in electrical communication with both the faucet body and the electromechanical valve. The controller and the electromechanical valve and the faucet body are in electrical communication with a power source. The controller is configured to receive information from the faucet body, to process the information, and to send an instruction to the electromechanical valve. The controller is configured to send an electrical "open" signal or instruction to the electromechanical valve, i.e. open the valve, depending on the processed information, thereby initiating fluid flow. The controller is configured to send an electrical "close" signal to the electromechanical valve, i.e. close the valve, thereby stopping fluid flow, also depending on the processed information or other factors.

In some embodiments, an electrical wire may be directly connected to the faucet body and/or faucet spout and the controller and/or the power source. An electrical wire may be directly connected to the electromechanical valve and the controller and/or the power source. The faucet body and/or faucet spout may be configured to perform as an electrode of a capacitive sensing system and thereby be associated with an electric field, which electric field may perform as a detection zone. In some embodiments, a faucet body may be considered to comprise a faucet spout.

Electrical communication between the controller and the electromechanical valve may wired or wireless, for example Wi-Fi, near field communication, Bluetooth® or ZigBee communication.

In some embodiments, the power source may be one or more of a primary battery, a secondary battery or an AC (alternating current) source with an AC/DC adapter. In some embodiments, a power source may comprise "harvested energy", for instance solar power or hydropower.

In some embodiments, a faucet body may be coupled to a countertop, a sink top, or a wall. In some embodiments, a wire may be connected to a faucet body and/or spout from below a countertop, below a sink top, or behind a wall.

In some embodiments, a faucet assembly may comprise an insulating material (insulator). In certain embodiments, an insulator may be coupled to both a countertop or sink top or wall and a faucet body, thus insulating the faucet body from the countertop/sink top/wall. An insulator may comprise a thermoplastic material, for example polyvinyl chloride (PVC), acrylonitrile-butadiene-styrene (ABS), and the like.

According to the disclosure, a faucet body may make up essentially the entire faucet, and the faucet spout may essentially be the outlet end. In other embodiments, a faucet spout may be defined as making up from any of about 2%, about 4%, about 6%, about 8%, about 10%, about 12%, about 14%, about 16%, about 18%, or about 20%, to any of about 22%, about 24%, about 26%, about 28%, about 30%, about 32%, about 34%, about 36%, or more, of the length of the faucet, from the outlet end to the base end.

In some embodiments, a faucet spout and faucet body may comprise dissimilar materials. For example, a faucet spout may comprise a conductive material and a faucet body may comprise an insulating material. In other embodiments, a faucet spout may comprise an insulating material and a faucet body may comprise a conductive material. In such embodiments, a faucet may comprise a coating so as to appear as one continuous solid part.

An insulating material may also be configured to electrically isolate one faucet assembly from another adjacent faucet assembly and/or from other plumbing fixtures and/or from pipes.

In some embodiments, an entire faucet body and spout may comprise a single material, such as an electrically conductive metal.

In some embodiments, a coating may be employed as an insulating material, for example a coating covering a conductive material or a portion of a conductive material.

In some embodiments, an electrical wire (or portion of wire) connecting the faucet body or faucet spout to a power source or controller may be insulated. In other embodiments, an electrical wire connecting the faucet body and or faucet spout to a power source or controller may be not be insulated.

In some embodiments, a solenoid valve body may perform as an insulating material. A solenoid body comprising a solenoid valve may be positioned in a faucet assembly in order to provide a desired insulation. In some embodiments, a manifold or adapter may perform as an insulating material. A manifold or adapter may be positioned in a faucet assembly to provide a desired insulation. For example, a manifold or adapter may be positioned in a fluid line between faucets in configurations where there are two or more faucets. In some embodiments, an assembly comprising two or more faucets and employing a desired insulating material provides for the faucets to be electrically isolated from each other. In some embodiments, a manifold or adapter and/or a solenoid valve body may electrically isolate each faucet from another.

In some embodiments, an insulating manifold, insulating adapter, or insulating solenoid valve body may comprise a thermoplastic material. In some embodiments, a thermoplastic solenoid valve body may be positioned for below deck/countertop fluid mixing. In some embodiments, a thermoplastic adapter may be positioned for above deck/countertop fluid mixing.

In some embodiments, an automatic faucet assembly may comprise two or more, for example 2, 3, 4, 5, 6, 7, 8, 9, 10, or more faucets, for example in a commercial setting such as an office building, an airport, hospital, and the like. In some embodiments, each faucet of 2 or more faucets are electrically isolated from each other.

The controller is configured to receive information from the faucet body regarding changes in or disturbances of the electric field, to process the information and to potentially send a command to the electromechanical valve depending on the processed information.

In some embodiments, the faucet body and the controller together may be considered as a capacitive sensor or a capacitive sensing system.

In an embodiment, a controller may comprise a mechanism configured to allow a technician to "tune" the controller. For example, a controller may comprise one or more buttons or dials configured to allow for adjustment of one or more thresholds, thus allowing for adjustment of sensitivity of detection. In another embodiment, a controller may comprise one or more "auto-tune" buttons or other mechanisms. For example, upon initial installation, an auto-tune mode may be initiated during which an end user interacts with the faucet and faucet sensing area in order to calibrate the system. Such a process may allow for a specific calibration of a faucet in a specific location from the factory settings. In some embodiments, a controller may be configured so that one or more thresholds and/or time and/or other parameters may be tuned and/or auto-tuned. A present sensing system is therefore configured to be customized to a certain end-use.

In other embodiments, a controller may be configured to be tuned and/or auto-tuned remotely. For example, a controller may be configured so that one or more thresholds and/or time and/or other parameters may be adjusted remotely via a wireless connection.

In an embodiment, the controller is configured to convert capacitance into a count value. An unprocessed count value may be referred to as a raw count. Processing a raw count may determine if an end user is approaching a faucet, is retreating from a faucet, is present at or near the faucet body and/or spout, is moving their hand or hands are at or near the faucet body and/or spout, is no longer present at or near the faucet body and/or spout, is moving their hand or hands away from the faucet body and/or spout, or determine an end user's hand or hands are no longer at or near a faucet body and/or spout. A count value is related to a capacitance signal amplitude. In this description, the terms "capacitance signal amplitude" and "count value" or "count threshold" may be used interchangeably.

In an embodiment, a present capacitive sensing system is configured to detect motion of an end user relative to a faucet body and/or faucet spout.

In an embodiment, the controller may be configured to recognize an end user approaching a faucet body and to open the electromechanical valve upon said recognition (detection). In some embodiments, a controller may be configured to recognize or detect a first capacitance signal amplitude. A first capacitance signal amplitude may be related to a first count threshold. In some embodiments, a controller may be configured to detect a second capacitance signal amplitude, which may be related to a second count threshold. In some embodiments, a controller may be configured to detect a third capacitance signal amplitude, which may be related to a third count threshold.

In some embodiments, a third capacitance signal amplitude and third count threshold is greater than a second capacitance signal amplitude and second count threshold which is greater than a first capacitance signal amplitude and a first count threshold.

In some embodiments, a controller may be configured to direct the electromechanical valve to open to deliver fluid upon detecting a first followed by a second count threshold. In other embodiments, a controller may be configured to direct the electromechanical valve to open upon detecting a first followed by a third count threshold. In other embodiments, a controller may be configured to direct the electromechanical valve to open upon detecting a second followed by a third count threshold. In other embodiments, a controller may be configured to direct the electromechanical valve to open only upon detecting a first, followed by a second, and followed by a third count threshold.

For example, a first count threshold may be set fairly low, so that presence of a user is easily detected—a "sensitive setting". For instance, a first count threshold may be set at about 20 counts. A second count threshold may be set a higher count level than a first count threshold. In this way, the sensing system may recognize a person approaching the faucet and not just passing by the faucet. A person passing by the faucet may be recognized as passing a first count threshold—but will not activate the faucet as a second higher count threshold is not passed. In other words, a present sensing system may recognize motion of a user towards the faucet.

In this way, a sensing system may be configured to be "sensitive" and recognize an end user and activate the faucet, while minimizing inadvertent faucet activation.

In some embodiments, a second count threshold may be from any of about 5%, about 10%, about 15%, about 20%, about 25%, about 30%, about 40%, about 50%, about 60%, about 70%, about 80%, about 90%, or about 100%, to any of about 120%, about 140%, about 160%, about 180%, about 200%, about 220%, about 240%, or about 260%, or more, higher than a first count threshold.

In other embodiments, a second count threshold may be from any of about 1.1 times, about 1.2 times, about 1.3 times, about 1.4 times, about 1.5 times, about 1.6 times, about 1.7 times, about 1.8 times, about 1.9 times, about 2.0 times, about 2.3 times, about 2.5 times, about 2.7 times, about 2.9 times, about 3.1 times, or about 3.3 times, to any of about 3.5 times, about 3.8 times, about 4.2 times, about 4.6 times, about 5.2 times, about 5.6 times, about 6.2 times, about 6.6 times, about 7.2 times, about 7.6 times, about 8.1 times, about 8.7 times, about 9.2 times, about 9.6 times, about 10.0 times, or more, a first count threshold.

A third count threshold may be greater than a second count threshold by the same or similar amounts. First, second and third capacitance signal amplitudes may have the same or similar relative differences from each other as for first, second, and third count thresholds.

In some embodiments, a controller may be configured to tentatively determine an end user is approaching the faucet once a first count threshold is reached. In some embodiments, a controller may be configured to confirm an end user is approaching the faucet once a second and/or third count threshold is reached. In some embodiments, the confirmation may require that the controller detect that the second and/or third count threshold is reached after the first count threshold within a specified time period, for example within a time period of from any of about 0.2 seconds, about 0.3 seconds, about 0.4 seconds, about 0.5 seconds, about 0.6 seconds, about 0.7 seconds, about 0.8 seconds, about 0.9 seconds, about 1.0 seconds, about 1.3 seconds, about 1.5 seconds, about 1.7 seconds, or about 2.0 seconds, to any of about 2.2 seconds, about 2.4 seconds, about 2.6 seconds, about 2.8 seconds, about 3.0 seconds, or more.

Upon confirming that an end user is approaching the faucet body, a controller may be configured to send an "open" instruction to the electromechanical valve to provide fluid flow.

In some embodiments, a controller may comprise a timer. Upon directing the electromechanical valve to open to deliver fluid, the controller may be configured to direct the electromechanical valve to close after a specified time period has elapsed and/or a certain volume of fluid has been dispensed.

In some embodiments, a controller may be configured to detect an end user retreating from the faucet and to close the electromechanical valve upon the detection that the end user is leaving the faucet. Detection of an end user retreating from the faucet may comprise detection of a third count threshold, followed by detection of a second count threshold. In some embodiments, detection of retreat from a faucet may comprise detection of a third count threshold, followed by detection of a first count threshold. In some embodiments, detection of retreat from a faucet may comprise detection of a second count threshold, followed by detection of a first count threshold. In some embodiments, detection of retreat from a faucet may comprise detection of a third count threshold, followed by detection of a second count threshold, followed by detection of a first count threshold.

In some embodiments, a controller may be configured to close the electromechanical valve after detecting an end user is retreating from/has retreated from the faucet and/or after specified time period has elapsed and/or a certain volume of fluid has been dispensed. A controller may comprise a timer, which timer may be configured to determine a time period has elapsed.

In an embodiment, a controller may be configured to close an electromechanical valve if the valve has been in an open position for a specified/defined time period.

In an embodiment, a controller may be configured to determine an average number of times the electromechanical valve is opened in a time period, and to adjust a specified/defined time period depending on the average number. A "time period" may for example be about 24 hours, about 12 hours, about 6 hours, about 4 hours, about 3 hours, about 2 hours, about 1 hour, or about 30 minutes. A "time period" may mean for instance a certain time period having high or low traffic. An adjustment may be an adjustment to lengthen or shorten a specified/defined open valve time period—in an effort to conserve both water and electric energy.

A third count threshold, a second count threshold, and a first count threshold employed for detection of an end user retreating from a faucet, may be identical to or different from (greater or less than) a third count threshold, a second count threshold, and a first count threshold employed for detection of an end user approaching the faucet.

In some embodiments, a controller may be configured to direct the electromechanical valve to close after a certain time has elapsed after detection of a third count threshold. In other embodiments, a controller may be configured to send a "close" signal to the electromechanical valve if a second and/or first count threshold is detected following detection of a third count threshold. In some embodiments, a determination that an end user is departing or has departed the faucet may require the controller detecting a third count threshold, followed by detecting a second and/or first count threshold within a time period of from any of about 0.2 seconds, about 0.3 seconds, about 0.4 seconds, about 0.5 seconds, about 0.6 seconds, about 0.7 seconds, about 0.8 seconds, about 0.9 seconds, about 1.0 seconds, about 1.3 seconds, about 1.5 seconds, about 1.7 seconds, or about 2.0 seconds, to any of about 2.2 seconds, about 2.4 seconds, about 2.6 seconds, about 2.8 seconds, about 3.0 seconds, or more.

In some embodiments, a controller may be configured to detect or recognize movement of an end user's hand or hands at or near the faucet body and/or faucet spout. In some embodiments, the term "at or near" may mean any end user's hand or hands, or any body part, is within a distance of from about 5 cm, about 6 cm, about 7 cm, about 8 cm, about 9 cm, about 10 cm, about 11 cm, or about 12 cm, to any of about 13 cm, about 14 cm, about 15 cm, about 16 cm, about 17 cm, about 18 cm, about 19 cm, about 20 cm, about 21 cm, about 22 cm, about 23 cm, about 24 cm, about 25 cm, or more, from any point of the faucet body and/or faucet spout.

In some embodiments, a controller may be configured to detect an end user's hand or hands movement at or near the faucet body and/or spout upon detection of a fourth count threshold. In some embodiments, a controller is configured to detect movement of an end user's hand or hands at or near the faucet body and/or spout upon detection of a fourth count threshold 2 or more times. That is to say, upon detecting a fourth count threshold, upon detecting a count below the fourth count threshold, and upon detecting a fourth count threshold a second time. In some embodiments, detection of hand movement at or near the faucet body and/or spout may comprise detection of a fourth count threshold 1, 2, 3, 4, or more times.

A controller may be configured to send an "open" instruction to the electromechanical valve to deliver fluid upon detection of an end user's hand or hands at or near the faucet body and/or spout. In some embodiments, a controller may be configured to open the electromechanical valve upon detection of movement of an end user's hand or hands at or near the faucet body and/or spout.

As mentioned, in some embodiments, a controller may comprise a timer, and may be configured to send a "close" instruction to the electromechanical valve after a certain time period has elapsed. In some embodiments, a controller may be configured to override a timer-initiated command upon detection of an end user's hand or hands at or near or near the faucet body and/or spout; and/or detection of movement of an end user's hand or hands at or near the faucet body and/or spout. In some embodiments, if a timer-initiated "close" command is overridden, the timer may be configured to reset and re-start. Once reset, a controller may be configured to send a "close" command to the electromechanical valve after a certain time period has (again) elapsed. This "second certain time period" may be the same or different than a "first certain time period", for instance may be less than a first certain time period.

In some embodiments, a controller may be configured to send an "open" instruction to the electromechanical valve upon detecting an end user approaching the faucet body; or upon detecting movement of an end user's hand or hands at or near the faucet body and/or spout; or only upon detecting both that an end user is approaching the faucet and movement of an end user's hand or hands at or near the faucet body and/or spout.

In some embodiments, a controller may be configured to recognize that an end user's hand or hands or no longer at or near the faucet body and/or spout and to send a "close" instruction to the electromechanical valve upon this detection.

In some embodiments, a controller may be configured to detect a fourth count threshold, and to open the electromechanical valve after the detection, within a time period of from any of about 0.2 seconds, about 0.3 seconds, about 0.4 seconds, about 0.5 seconds, about 0.6 seconds, about 0.7 seconds, about 0.8 seconds, about 0.9 seconds, about 1.0 seconds, about 1.3 seconds, about 1.5 seconds, about 1.7 seconds, or about 2.0 seconds, to any of about 2.2 seconds, about 2.4 seconds, about 2.6 seconds, about 2.8 seconds, about 3.0 seconds, or more. This detection may be of a first, second, third, fourth, or more detection of the fourth count threshold.

In some embodiments, a controller may be configured to close the electromechanical valve upon detecting that a fourth count threshold is not reached within a defined time period, for example within a time period of from any of about 0.2 seconds, about 0.3 seconds, about 0.4 seconds, about 0.5 seconds, about 0.6 seconds, about 0.7 seconds, about 0.8 seconds, about 0.9 seconds, about 1.0 seconds, about 1.3 seconds, about 1.5 seconds, about 1.7 seconds, or about 2.0 seconds, to any of about 2.2 seconds, about 2.4 seconds, about 2.6 seconds, about 2.8 seconds, about 3.0 seconds, or more.

In some embodiments, a controller may be configured to detect a third count threshold, and/or followed by a second count threshold, and/or followed by a first count threshold, after detecting a fourth count threshold, thus confirming that an end user has removed their hand or hands from the faucet body and/or spout and is departing or has departed from the faucet. The controller may be configured to close the electromechanical valve upon making this confirmation. In some embodiments, a time period to confirm an end user has removed their hand or hands from the faucet and is departing or has departed from the faucet, may for example be within a time period of from any of about 0.2 seconds, about 0.3 seconds, about 0.4 seconds, about 0.5 seconds, about 0.6 seconds, about 0.7 seconds, about 0.8 seconds, about 0.9 seconds, about 1.0 seconds, about 1.3 seconds, about 1.5 seconds, about 1.7 seconds, or about 2.0 seconds, to any of about 2.2 seconds, about 2.4 seconds, about 2.6 seconds, about 2.8 seconds, about 3.0 seconds, or more.

In some embodiments, a controller comprising a timer may be configured to determine (calculate) an average time period that an end user's hand or hands are at or near the faucet body and/or spout. In some embodiments, a controller may be configured to determine an average number of users at a faucet with a certain time period.

In some embodiments, a controller may be configured to send a "close" instruction to the electromechanical valve when a time period that the valve has been in an open position is greater than or equal to a calculated average time period that an end user's hand or hands have been at or near the faucet body and/or spout. A calculated average time period may be a "rolling average" and may be recalculated periodically.

In some embodiments, a controller may be configured to extend a time period that an electromechanical valve is in an open position before sending a "close" instruction, if the controller determines a high average number of users at a faucet within a certain time period.

In some embodiments, a controller may be configured to recognize if the power source is a battery or an AC power source (with an AC/DC adapter). In some embodiments, a controller may be configured to perform fewer detections depending on the power source. For example, if the power source is a battery only, the controller may be configured to perform fewer detections than if the power source is an AC source.

In some embodiments, a controller may be configured to detect battery decay. In such embodiments, a controller may be configured to perform fewer detections towards an end of a battery lifetime than at a beginning; or may be configured to perform fewer detections when it is determined the power source is a battery, as compared to a number of detections for an AC source. These configurations may extend battery life. For a wired AC power source, the electric power source will remain about constant, and a controller may be configured to perform a higher number of detections.

FIG. 1 represents a capacitive signal counts vs. time graph for an end user approaching a faucet, moving their hands at the faucet, and departing the faucet, according to an embodiment. From time zero, the capacitance signal counts increase with time, indicating an end user is approaching a faucet body. When a threshold 11 of about 30 counts is reached, the controller determines an end user may be approaching the faucet. When threshold 12, set at about 40 counts, and/or when threshold 13, set at about 50 counts is reached, the controller confirms that an end user is approaching the faucet. In some embodiments, a second and or a third threshold must be passed within a certain time period in order to confirm an end user is approaching the faucet. In some embodiments, upon confirmation that an end user is approaching a faucet body, the controller is configured to send an "open" signal to the electromechanical valve to initiate water flow.

As the end user continues to approach the faucet as illustrated in FIG. 1, a higher, fourth count threshold 14 is reached and detected, indicating an end user has placed their hand or hands at or near the faucet body and/or spout. Fourth count threshold 14 in this instance is set at about 170 counts. Between time $T_3$ and time $T_6$, it is seen that fourth count threshold 14 is reached a number of times, indicating an end user is moving their hand or hands at or near the faucet body and/or spout. In some embodiments, a controller may be configured to open the electromechanical valve upon detection of a fourth count threshold. In other embodiments, a controller may be configured to open the electromechanical valve upon detecting a fourth count threshold 2 or more times, indicating movement at the faucet body and/or spout. In still other embodiments, a controller may be configured to open the electromechanical valve upon detecting an end user approaching the faucet and an end user at the faucet. In still other embodiments, a controller may be configured to open the electromechanical valve upon detecting an end user approaching the faucet and an end user moving one's hand or hands at the faucet body and/or spout.

Still referring to FIG. 1, a decreasing capacitance signal count from time $T_5$ through time $T_8$ indicates and end user departing the faucet. It is seen that third threshold 13 is reached, followed by threshold 12, followed by threshold 11. A controller may be configured to tentatively determine an end user is departing the faucet upon threshold 13 being reached, and confirm the end user is departing the faucet upon threshold 12 and/or threshold 11 are reached. In some embodiments, a second and/or first threshold must be reached within a certain time period in order to confirm an end user is departing the faucet. The controller may be configured to close the electromechanical valve upon detecting that threshold 14 is not reached within a certain time period. In another embodiment, the controller may be configured to close the electromechanical valve upon detecting a fourth threshold 14 followed by a third, a second, or a first threshold.

Figure 2:
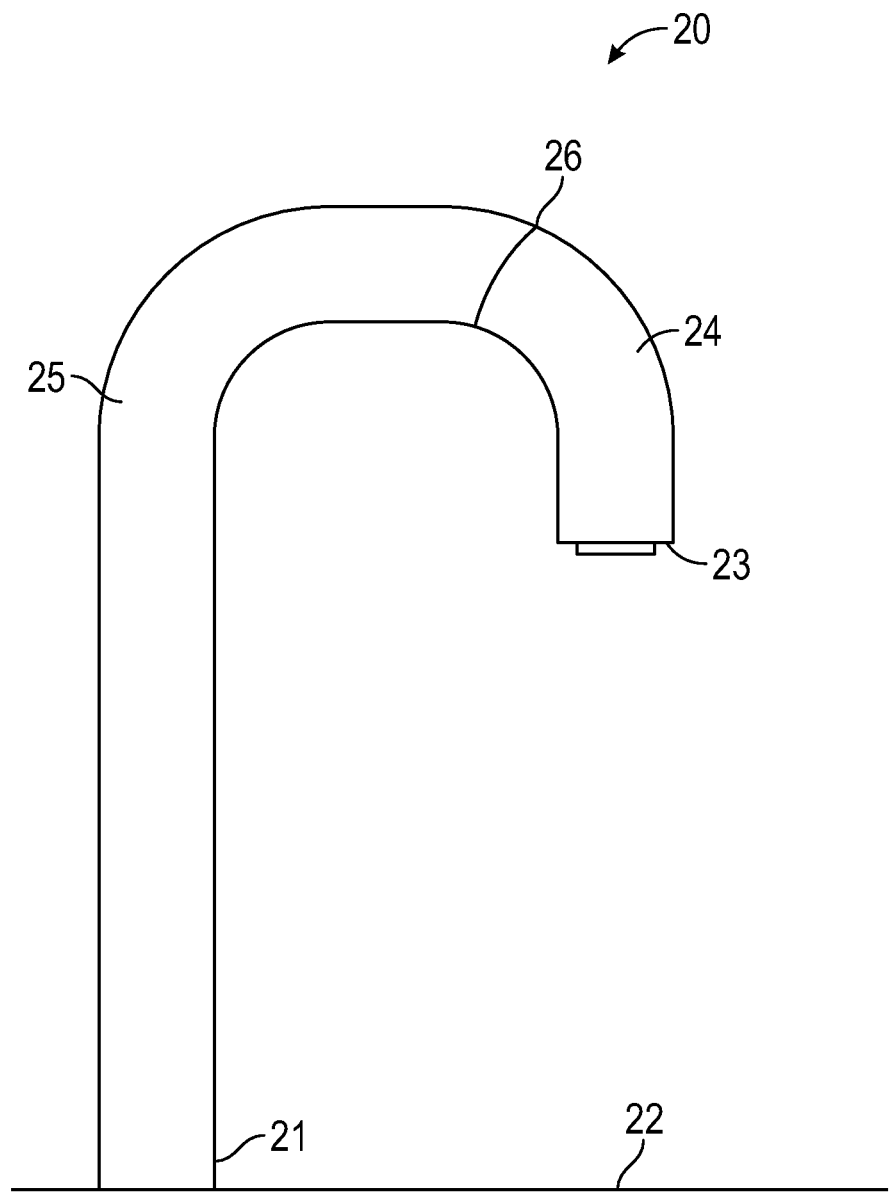
FIG. 2 shows a faucet, according to an embodiment.

FIG. 2 shows a faucet 20, according to an embodiment. Faucet 20 comprises spout 24 having outlet end 23 and faucet body 25 comprising faucet base end 21, coupled to countertop/deck 22. Spout 24 and faucet body 25 are coupled at joint 26. In this embodiment, faucet body 25 is made of a non-conductive insulating material, and faucet spout 24 is made of a conducting metal material. In this embodiment, spout 24 makes up about 15% of the total length of the faucet body plus faucet spout. Also in this embodiment, joint 26 will be coated so the faucet appears as one solid continuous piece.

Following are some embodiments of the disclosure.

In a first embodiment, disclosed is an automatic faucet assembly comprising a faucet body and spout; an electromechanical valve; a controller; and a power source, wherein the faucet body comprises an electrically conductive material and is configured to be associated with an electric field, the faucet spout is configured to deliver water when the electromechanical valve is in an open position and to not deliver water when the electromechanical valve is in a closed position, the controller, the faucet body, the electromechanical valve, and the power source are in electrical communication, and the controller is configured to detect motion of an end user in the electric field.

In a second embodiment, disclosed is an automatic faucet assembly according to the first embodiment, wherein the controller is configured to detect an end user approaching the faucet body, and to open the electromechanical valve upon said detection.

In a third embodiment, disclosed is an automatic faucet assembly according to the first or second embodiments, wherein the controller is configured to detect an end user retreating from the faucet body, and to close the electromechanical valve upon said detection.

In a fourth embodiment, disclosed is an automatic faucet assembly according to any of the preceding embodiments, wherein the controller is configured to detect a first capacitance signal amplitude, followed by a second capacitance signal amplitude, when an end user approaches the faucet body, and/or a second capacitance signal amplitude, followed by a first capacitance signal amplitude when an end user retreats from the faucet body.

In a fifth embodiment, disclosed is an automatic faucet assembly according to any of the preceding embodiments, wherein the controller is configured to detect a first capacitance signal amplitude, followed by a second capacitance signal amplitude, followed by a third capacitance signal amplitude when an end user approaches the faucet body, and/or a third capacitance signal amplitude, followed by a second capacitance signal amplitude, followed by a first capacitance signal amplitude when an end user retreats from the faucet body.

In a sixth embodiment, disclosed is an automatic faucet assembly according to any of the preceding embodiments, wherein the third signal amplitude is greater than the second signal amplitude, and the second signal amplitude is greater than the first signal amplitude.

In a seventh embodiment, disclosed is an automatic faucet assembly according to any of the preceding embodiments, wherein the second signal amplitude is from about 1.1 times to about 3.0 the first signal amplitude, and wherein the third signal amplitude is from about 1.1 times to about 3.0 times the second signal amplitude.

In an eighth embodiment, disclosed is an automatic faucet assembly according to any of the preceding embodiments, wherein the controller is configured to determine an end user is approaching the faucet body upon detection of a second capacitance signal amplitude following detection of a first capacitance signal amplitude within a time period of from about 0.2 seconds to about 2.0 seconds.

In a ninth embodiment, disclosed is an automatic faucet assembly according to any of the preceding embodiments, wherein the controller is configured to determine an end user is retreating from the faucet body upon detection of a first capacitance signal amplitude following detection of a second capacitance signal amplitude within a time period of from about 0.2 seconds to about 2.0 seconds.

In a tenth embodiment, disclosed is an automatic faucet assembly according to the first embodiment, wherein the controller is configured to detect movement of an end user's hand or hands at or near the faucet body and/or faucet spout, and to open the electromechanical valve upon said detection.

In an eleventh embodiment, disclosed is an automatic faucet assembly according to the tenth embodiment, wherein the controller is configured to detect movement of an end user's hand or hands within a distance of about 16 cm from any point of the faucet body and/or faucet spout, and to open the electromechanical valve upon said detection.

In a twelfth embodiment, disclosed is an automatic faucet assembly according to any of the preceding embodiments, wherein the controller is configured to detect a fourth capacitance signal amplitude upon an end user's hand or hands being present at or near the faucet body and/or spout;

or upon movement of an end user's hand or hands at or near the faucet body and/or faucet spout, and to open the electromechanical valve upon said detection.

In a thirteenth embodiment, disclosed is an automatic faucet assembly according to any of the tenth to twelfth embodiments, wherein the controller is configured to open the electromechanical valve upon detecting a fourth capacitance signal amplitude 2 or more times.

In a fourteenth embodiment, disclosed is an automatic faucet assembly according to any of the tenth to thirteenth embodiments, wherein the controller is configured to detect a fourth capacitance signal amplitude, and to open the electromechanical valve after said detection within a total time period of from about 0.2 seconds to about 3.0 seconds.

In a fifteenth embodiment, disclosed is an automatic faucet assembly according to any of the tenth to fourteenth embodiments, wherein the controller is configured to detect a fourth capacitance signal amplitude 2 or more times, and to open the electromechanical valve after the second detection within a total time period of from about 0.3 seconds to about 3.0 seconds.

In a sixteenth embodiment, disclosed is an automatic faucet assembly according to any of the tenth to fifteenth embodiments, wherein the controller is configured to detect that an end user's hand or hands are no longer at or near the faucet body and/or faucet spout and to close the electromechanical valve upon said detection.

In a seventeenth embodiment, disclosed is an automatic faucet assembly according to any of the preceding embodiments, wherein the controller is configured to detect an end user approaching the faucet body and presence and/or movement of an end user's hand or hands at or near the faucet body and/or faucet spout, and to open the electromechanical valve upon detecting the end user approaching the faucet body and presence and/or movement of the end user's hand or hands at or near the faucet body and/or spout.

In an eighteenth embodiment, disclosed is an automatic faucet assembly according to any of the preceding embodiments, wherein the controller is configured to detect a first capacitance signal amplitude, followed by a second capacitance signal amplitude, followed by a fourth capacitance signal amplitude when an end user approaches the faucet body and places and/or moves their hand or hands at or near the faucet body and/or faucet spout, and a fourth capacitance signal amplitude, followed by a second capacitance signal amplitude, followed by a first capacitance signal amplitude when an end user removes their hand or hands from at or near the faucet body and/or faucet spout and retreats from the faucet body.

In a nineteenth embodiment, disclosed is an automatic faucet assembly according to any of the preceding embodiments, wherein the controller is configured to detect a first capacitance signal amplitude, followed by a second capacitance signal amplitude, followed by a third capacitance signal amplitude, followed by a fourth capacitance signal amplitude when an end user approaches the faucet body and places and/or moves their hand or hands at or near the faucet body and/or faucet spout, and a fourth capacitance signal amplitude, followed by a third capacitance signal amplitude, followed by a second capacitance signal amplitude, followed by a first capacitance signal amplitude when an end user removes their hand or hands from at or near the faucet body and/or faucet spout and retreats from the faucet body.

In a twentieth embodiment, disclosed is an automatic faucet assembly according to any of the preceding embodiments, wherein the controller comprises a timer.

In a twenty-first embodiment, disclosed is an automatic faucet assembly according to the twentieth embodiment, wherein the controller is configured to close the electromechanical valve if the valve has been in the open position for a specified/defined time period.

In a twenty-second embodiment, disclosed is an automatic faucet assembly according to the twentieth or twenty-first embodiments, wherein the controller is configured to determine an average time period an end user's hand or hands are at or near the faucet body and/or faucet spout.

In a twenty-third embodiment, disclosed is an automatic faucet assembly according to the twenty-second embodiment, wherein the controller is configured to close the electromechanical valve if the valve has been in the open position for a time period of greater than or equal to the average time period.

In a twenty-fourth embodiment, disclosed is an automatic faucet assembly according to the twenty-first embodiment, wherein the controller is configured to determine an average number of times the electromechanical valve is opened in a time period, and to adjust the specified/defined time period depending on the average number.

In a twenty-fifth embodiment, disclosed is an automatic faucet assembly according to any of the preceding embodiments, wherein the power source is a battery and/or an alternating current source.

In a twenty-sixth embodiment, disclosed is an automatic faucet assembly according to the twenty-fifth embodiment, wherein the controller is configured to recognize if the power source is a battery source, an alternating current source, or both.

In a twenty-seventh embodiment, disclosed is an automatic faucet assembly according to the twenty-sixth embodiment, wherein the controller is configured to adjust a number of detections performed, depending on the power source.

In a twenty-eighth embodiment, disclosed is an automatic faucet assembly according to any of the preceding embodiments, wherein the faucet spout makes up from about 2% to about 40% of the total length of the faucet, from outlet end to base end.

In a twenty-ninth embodiment, disclosed is an automatic faucet assembly according to any of the preceding embodiments, comprising an insulating material.

In a thirtieth embodiment, disclosed is an automatic faucet assembly according to any of the preceding embodiments, wherein the faucet spout comprises an electrically conductive material and the faucet body comprises an insulating material.

In a thirty-first embodiment, disclosed is an automatic faucet assembly according to any of the first to twenty-ninth embodiments, wherein the faucet spout comprises an insulating material and the faucet body comprises an electrically conductive material.

In a thirty-second embodiment, disclosed is an automatic faucet assembly according to any of the preceding embodiments, wherein the faucet body and/or faucet spout comprises a coating.

In a thirty-third embodiment, disclosed is an automatic faucet assembly according to any of the preceding embodiments, wherein the faucet body and/or faucet spout comprises an insulating coating.

In a thirty-fourth embodiment, disclosed is a method of controlling fluid flow from a faucet having a faucet body and spout, the method comprising detecting an end user approaching the faucet body.

In a thirty-fifth embodiment, disclosed is a method according to the thirty-fourth embodiment, further comprising detecting and end user retreating from the faucet body.

In a thirty-sixth embodiment, disclosed is a method according to the thirty-fourth or thirty-fifth embodiments, further comprising detecting movement of an end user's hand or hands at or near the faucet body and/or faucet spout.

In a thirty-seventh embodiment, disclosed is a method according to the thirty-sixth embodiment, further comprising detecting that the end user's hand or hands are no longer at or near the faucet body and/or faucet spout.

In a thirty-eighth embodiment, disclosed is a method of controlling fluid flow from a faucet having a faucet body and spout, the method comprising detecting a movement of an end user's hand or hands at or near the faucet body and/or faucet spout.

In a thirty-ninth embodiment, disclosed is a method according to the thirty-eighth embodiment, further comprising detecting that the end user's hand or hands are no longer at or near the faucet body and/or spout.

The term "adjacent" may mean "near" or "close-by" or "next to".

The term "coupled" means that an element is "attached to" or "associated with" another element. Coupled may mean directly coupled or coupled through one or more other elements. An element may be coupled to an element through two or more other elements in a sequential manner or a non-sequential manner. The term "via" in reference to "via an element" may mean "through" or "by" an element. Coupled or "associated with" may also mean elements not directly or indirectly attached, but that they "go together" in that one may function together with the other.

The term "flow communication" means for example configured for liquid or gas flow there through and may be synonymous with "fluidly coupled" or "fluid communication". The terms "upstream" and "downstream" indicate a direction of gas or fluid flow, that is, gas or fluid will flow from upstream to downstream.

The term "electrical communication" may be synonymous with "electrically coupled" or "electrically connected" and may mean an element may send or receive electricity or electronic signals to another element, either via a wired connection or a wireless connection. The term "associated with" may mean "coupled", i.e. "electrically coupled".

The term "towards" in reference to a of point of attachment, may mean at exactly that location or point or, alternatively, may mean closer to that point than to another distinct point, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more of the definition; for example the term "substantially perpendicular" may mean the 90° perpendicular angle may mean "about 90°". The term "generally" may be equivalent to "substantially".

Features described in connection with one embodiment of the disclosure may be used in conjunction with other embodiments, even if not explicitly stated.

Embodiments of the disclosure include any and all parts and/or portions of the embodiments, claims, description and figures. Embodiments of the disclosure also include any and all combinations and/or sub-combinations of embodiments.

The invention claimed is:

1. An automatic faucet assembly comprising:
a faucet having a body and a spout;
an electromechanical valve;
a controller; and
a power source,
wherein
the faucet body and/or spout comprises an electrically conductive material,
the faucet spout is configured to deliver water when the electromechanical valve is in an open position and to not deliver water when the electromechanical valve is in a closed position,
the controller, the faucet body and/or spout, the electromechanical valve, and the power source are in wired electrical communication,
the faucet body and/or spout are directly electrically connected to the power source,
the faucet body and/or spout are configured to perform as an electrode of a capacitive sensing system and to be associated with an electric field, the electric field configured to perform as a detection zone,
the controller is configured to detect motion of an end user in the electric field,
the faucet assembly comprises an electromechanical valve body, an adapter, or a manifold, the electromechanical valve body, the adapter, and the manifold comprise a non-conductive insulating material, and
the electromechanical valve body, the adapter, and the manifold are configured to electrically isolate the faucet assembly,
wherein the controller is configured to:
determine a power characteristic of the power source, wherein the power characteristic includes at least one of a power source type and power source condition, wherein the power source is a battery or an AC power source;
adjust a sensitivity of the capacitive sensing system based on the determined power characteristic;
wherein the adjustment of sensitivity includes modifying at least one of: a detection frequency, a detection threshold, and a sampling rate of the capacitive sensing system, such that the capacitive sensing system operates with a lower sensitivity when the power characteristic indicates a limited power supply compared to when the power characteristic indicates an abundant power supply.

2. The automatic faucet assembly according to claim 1, wherein
the controller is configured to detect an end user approaching the faucet body, and to open the electromechanical valve upon said detection, and/or wherein the controller is configured to detect an end user retreating from the faucet body, and to close the electromechanical valve upon said detection.

3. The automatic faucet assembly according to claim 1, wherein the controller is configured to detect a first capacitance signal amplitude, followed by a second capacitance signal amplitude, when an end user approaches the faucet body, and/or a second capacitance signal amplitude, followed by a first capacitance signal amplitude when an end user retreats from the faucet body, wherein the second signal amplitude is greater than the first signal amplitude.

4. The automatic faucet assembly according to claim 3, wherein the second signal amplitude is from about 1.1 times to about 3.0 times the first signal amplitude.

5. The automatic faucet assembly according to claim 3, wherein the controller is configured to determine an end user is approaching the faucet body upon detection of the second capacitance signal amplitude following detection of the first capacitance signal amplitude within a time period of from about 0.2 seconds to about 2.0 seconds, and/or wherein the controller is configured to determine an end user is retreating from the faucet body upon detection of the first capacitance signal amplitude following detection of the second capacitance signal amplitude within a time period of from about 0.2 seconds to about 2.0 seconds.

6. The automatic faucet assembly according to claim 3, wherein the controller is configured to detect a third capacitive signal amplitude and a fourth capacitance signal amplitude upon an end user's hand or hands being present at or near the faucet body and/or spout; or upon movement of an end user's hand or hands at or near the faucet body and/or faucet spout, and to open the electromechanical valve upon said detection.

7. The automatic faucet assembly according to claim 6, wherein the controller is configured to open the electromechanical valve upon detecting the fourth capacitance signal amplitude 2 or more times, and wherein the controller is configured to open the electromechanical valve after said detection within a total time period of from about 0.2 seconds to about 3.0 seconds.

8. The automatic faucet assembly according to claim 6, wherein the controller is configured to detect that the end user's hand or hands are no longer at or near the faucet body and/or faucet spout and to close the electromechanical valve upon said detection.

9. The automatic faucet assembly according to claim 1, wherein the controller is configured to detect a first capacitance signal amplitude, followed by a second capacitance signal amplitude, followed by a third capacitance signal amplitude, followed by a fourth capacitance signal amplitude when an end user approaches the faucet body and places and/or moves their hand or hands at or near the faucet body and/or faucet spout, the controller is configured to detect a fourth capacitance signal amplitude, followed by a third capacitance signal amplitude, followed by a second capacitance signal amplitude, followed by a first capacitance signal amplitude when an end user removes their hand or hands from at or near the faucet body and/or faucet spout and retreats from the faucet body, the controller is configured to open the electromechanical valve upon detecting the end user approaching the faucet body and placement and/or movement of the end user's hand or hands at or near the faucet body and/or spout, and the controller is configured to close the electromechanical valve upon detecting removal of the end user's hand or hands from at or near the faucet body and/or faucet spout and the end user retreating from the faucet body.

10. The automatic faucet assembly according to claim 1, wherein the controller is configured to detect a first capacitance signal amplitude, followed by a second capacitance signal amplitude, followed by a third capacitance signal amplitude, followed by a fourth capacitance signal amplitude when an end user approaches the faucet body and places and/or moves their hand or hands at or near the faucet body and/or faucet spout, and a fourth capacitance signal amplitude, followed by a third capacitance signal amplitude, followed by a second capacitance signal amplitude, followed by a first capacitance signal amplitude when an end user removes their hand or hands from at or near the faucet body and/or faucet spout and retreats from the faucet body.

11. The automatic faucet assembly according to claim 1, wherein the controller is configured to close the electromechanical valve if the valve has been in the open position for a defined open time period.

12. The automatic faucet assembly according to claim 11, wherein the controller is configured to determine an average number of times the electromechanical valve is opened in a time period, and to adjust the defined open time period depending on the average number.

13. The automatic faucet assembly according to claim 1, wherein the controller is configured to determine an average time period an end user's hand or hands are at or near the faucet body and/or faucet spout.

14. The automatic faucet assembly according to claim 13, wherein the controller is configured to close the electromechanical valve if the valve has been in the open position for a time period of greater than or equal to the average time period.

15. The automatic faucet assembly according to claim 1, wherein the controller is configured to adjust a number of detections performed, depending on the power source.

16. The automatic faucet assembly according to claim 1, wherein the faucet spout makes up from about 2% to about 40% of the total length of the faucet, from outlet end to base end.

17. The automatic faucet assembly according claim 1 wherein one of the faucet spout and the faucet body comprises an electrically conductive material and the other comprises an insulating material.

18. The automatic faucet assembly according to claim 1, wherein the insulating material is a thermoplastic.

19. The automatic faucet assembly according to claim 1, wherein the faucet assembly comprises two or more faucets, wherein each faucet is electrically isolated from an adjacent faucet.

20. The automatic faucet assembly according to claim 1, wherein the faucet body and/or faucet spout comprises an insulating coating.

* * * * *